United States Patent [19]

Anderson

[11] 4,254,626
[45] Mar. 10, 1981

[54] DEAERATING SYSTEM FOR SEA THERMAL POWER PLANTS

[75] Inventor: J. Hilbert Anderson, York, Pa.

[73] Assignee: Sea Solar Power, York, Pa.

[21] Appl. No.: 66,512

[22] Filed: Aug. 14, 1979

[51] Int. Cl.³ .......................... F03G 7/02; F03G 7/04
[52] U.S. Cl. ........................................ 60/641; 165/45
[58] Field of Search .................... 60/641; 165/145; 202/176

[56] References Cited

U.S. PATENT DOCUMENTS

| | | | |
|---|---|---|---|
| 2,006,985 | 7/1935 | Claude et al. | 60/641 |
| 3,975,912 | 8/1976 | Green | 60/641 |

Primary Examiner—Frank Sever
Attorney, Agent, or Firm—Kemon & Estabrook

[57] ABSTRACT

Apparatus for deaerating a stream of warm surface sea water for removing a portion of the gases from the water prior to its entry into a heat exchanger or boiler. The gases, such as oxygen, can be removed by subjecting the warm surface sea water to a vacuum after which the water, having been collected at a plurality of sources, is fed in separate passageways to a common plenum chamber from where the water is discharged through the passages of the boiler or heat exchanger into the ocean.

4 Claims, 2 Drawing Figures

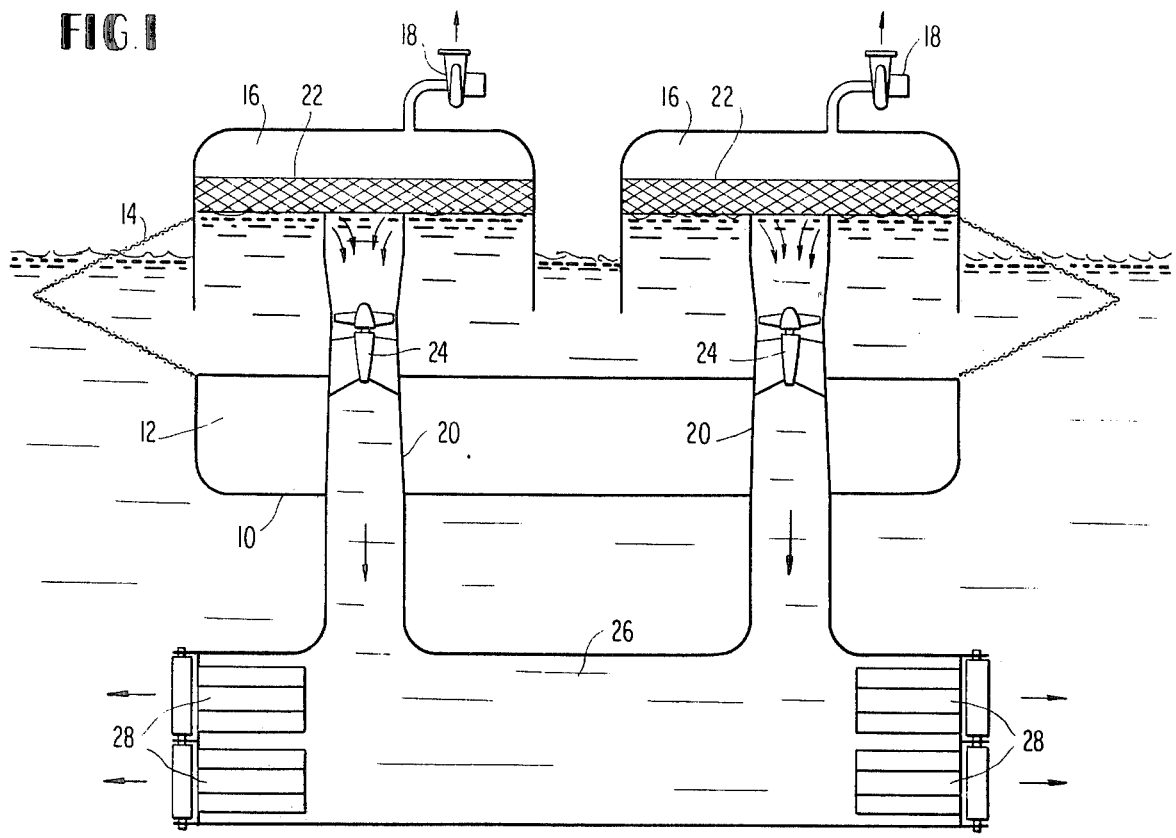
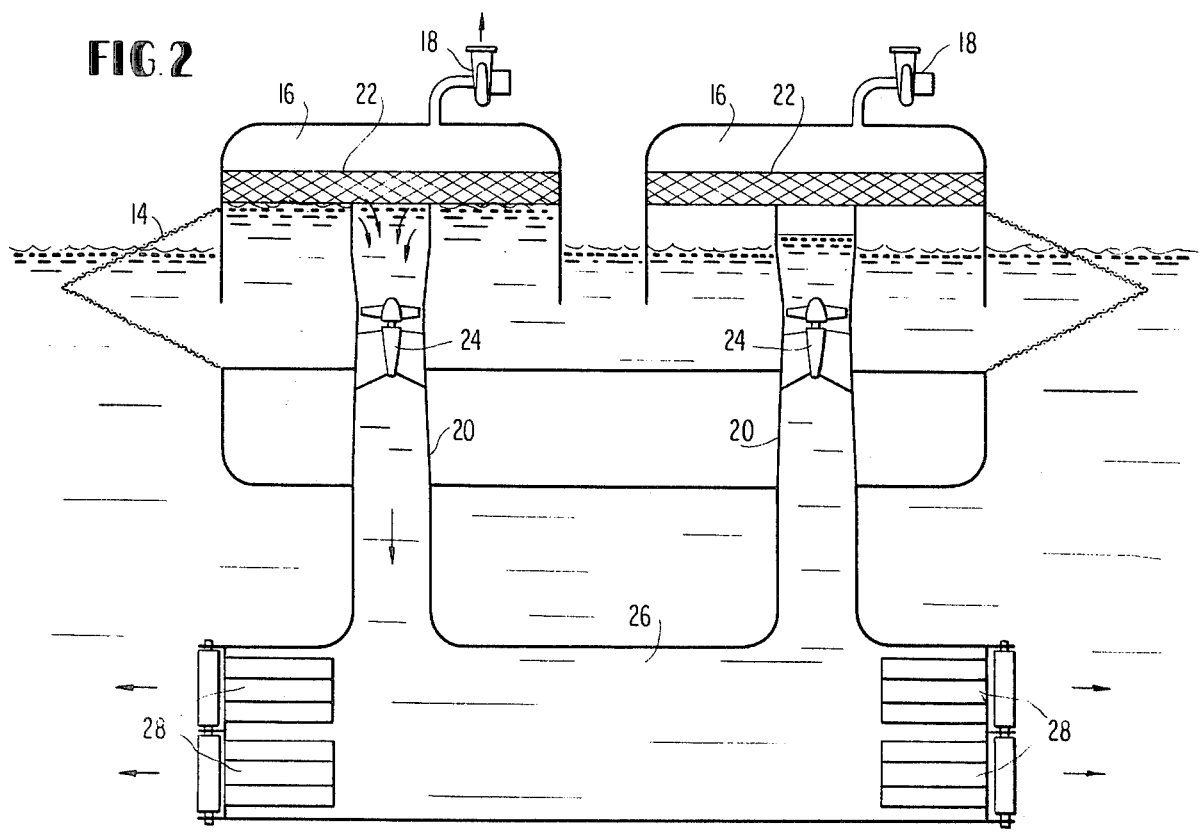

DEAERATING SYSTEM FOR SEA THERMAL POWER PLANTS

BACKGROUND OF THE INVENTION

This invention relates to the extraction of a portion of the gases from warm surface water prior to pumping said water in parallel paths to a common plenum chamber.

In applicant's prior U.S. Pat. No. 3,558,439 dated Jan. 26, 1971, there is disclosed a method and apparatus for removing virtually all of the gases from a stream of warm surface sea water by deaerating and evaporating said stream. The deaeration is effected by moving a stream of water through a designated space and exhausting said space above said stream to the atmosphere by means of an air compressor, thus subjecting the stream of water to a reduced pressure at which dissolved air comes out of solution. It is important that the stream of warm sea water be freed of dissolved air before it flows through the boiler or heat exchanger as the dissolved air tends to create corrosion problems with respect to the heat exchangers.

In addition to the foregoing another problem that is likely to be found in a sea thermal power plant is one of barnacles and other crustaceae attaching themselvels to the surfaces of the heat exchangers. This results in said heat exchangers becoming fouled and plugged up to the extent that very little water will flow through them. The water supply for the heat exchangers or boilers is accomplished by a suitable pump delivering the warm water to said boilers and eventually to the open ocean. One of the disadvantages of such an arrangement is the inability of a single pump to supply a multitude of boilers or heat exchangers as well as the complete shut down of the sea thermal power plant if the pump has to be replaced or repaired.

SUMMARY OF THE INVENTION

The present invention is directed to an apparatus that is effective in preventing crustaceae from growing on heat exchanger surfaces by removing oxygen from the warm surface sea water so that the oxygen supply is depleted to possibly two thirds or less of the natural oxygen content in the water. This effectively starves the crustaceae of an oxygen supply and thus can prevent them from attaching themselves and growing on the heat exchanger or boiler surfaces. In the present situation is apparently is not necessary to remove all of the gases form the surface sea water at the removal of a relatively low percentage of the gases would appear to be sufficient to inhibit growth of crustaceae from the surfaces of the heat exchanger or boiler.

The present invention is further directed to the concept of providing a plurality of pumps each arranged in a separate conduit or passageway. The conduits or passageways terminate in a common plenum chamber which supplies a multitude of boilers or heat exchangers through which the warm sea water flows back to the sea. The conduits or passageways are connected to deaerators that extend above the deck of the floating power plant so that pumps positioned in the conduits or passageways will draw warm surface sea water through said deaerators and conduits or passageways to a common plenum chamber. The water is then discharged through the boiler or heat exchange passages into the sea. Thus if one pump is shut down for repairs the other pump can supply all of the boilers or heat exchangers at a reduced rate of flow.

BRIEF DESCRIPTION OF THE DRAWING

FIG. 1 is a vertical sectional view of a portion of a sea thermal power plant embodying the principles of the present invention; and FIG. 2 is a vertical sectional view of the power plant of FIG. 1 with one of the pumps being inoperative.

DESCRIPTION OF THE PREFERRED EMBODIMENT

Refering to the drawings there is shown a portion of a sea thermal power plant embodying a hull 10 with a buoyant space 12 and inlet screens 14 connected to and carried by the hull and the deck thereof. The inlet screens 14 consist of lower and upper portions which are connected to the hull and deck, respectively, so that the normal sea level is located approximately half way of the upper screen portion. The deck of hull 10 has mounted thereon a plurality of dome shaped deaerators 16, which are preferably of circular configuration, and are so positioned as to draw warm surface sea water from under the water surface inside of the screen 14. The deaerators 16 have connected to or mounted in the domed portion thereof a compressor 18 with the tops of suitable inlet pipes or conduits 20 extending into the deaerators with said tops being positioned approximately 8 to 10 feet above the level of the sea. There is also positioned in the domed portion of the deaerator, superjacent the top of the inlet pipes or conduits 20, a screen matrix 22.

The compressors 18 are utilized to lift the surface water of the sea by pulling a vacuum on the water so as to lift the water to a height or level above the suction inlet of the conduits or pipes 20. The domed portion of the deaerators are designed to provide sufficient area for the compressors 18 to suck ot withdraw the dissolved oxygen and other gases from the water. The sea water that is drawn into the deaerators 16 flows against the screen matrix 22 and the normal wave motion in the sea tends to move the water level in the domed portion of the deaerators up and down cyclically which motion alternately wets the surface of the screen matrix 22. This latter motion presents more effective surface area for the compressors 18 to pull out the excess air and foam in the water as well as the dissolved gases so that the compressor is able to pump out of the dome a substantial amount of the gases contained therein.

As shown in FIG. 1 the inlet conduits or pipes 20 are arranged in spaced parallel relationship with a pump 24 being mounted in each conduit or pipe. The conduits or pipes 20 terminate in a common plenum chamber 26 which has positioned in its respective ends a plurality of boilers or heat exchangers 28. Thus the water drawn into the conduits 20 by the pumps 24 will be delivered to the common plenum chamber from whence the water will be discharged through the passages of the boilers or heat exchangers 28 into the sea.

Inasmuch as the boilers or heat exchangers 28 require considerable area it is desirable to have two or more conduits or pipes 20 conducting the warm water from the deaerators 16 to the boilers or heat exchangers by means of the pumps 24. This arrangement has the advantage of permitting the pumps 24 to draw warm surface water from different deareators 16 and to discharge the water into a common plenum chamber wherein the boilers or heat exchangers are located. Thus if one pump 24 is shut down for repairs the other pump can supply all of the boilers or heat exchangers 28 at a reduced rate of flow thereby avoiding the necessity of shutting down the sea thermal power plant. The usual procedure with such an arrangement, and wherein one pump of a plurality is shut down, is to employ a check valve in the line of the shut down pump so that the discharge pressure from the other pump does not force the water back through the pump that is shut down and into the sea, thereby tending to bypass the boilers or heat exchangers through which the water should pass.

While the generally established practice is to put check valves in parallel pumping lines, so that reverse flow in the shut down pump line will not occur, such a practice is not deemed warranted in a sea thermal power plant. The cost of check valves are rather high and same tend to create an additional pressure drop during normal operation which tends to interfere with the overall sea thermal power plant efficiency because water pumping power is a very major parasitic loss. Thus the problem of reverse flow in a shut down pump in a sea thermal power plant is substantially solved by locating the top of the inlet pipes or conduits 20 in the deareators 16 well above sea leavel which could be a distance of from 8 to 10 feet.

In normal operation the compressors 18 pull a vacuum so as to lift or raise the warm surface sea water from inside of the screens 14 high enough into the domed spaced of the deaerators 16 so that the level of water is above the suction inlet of the pipes or conduits 20. When the compressors 18 are operating a water level is maintained above the inlet conduits or pipes 20 so that the pumps 24 in operating will syphon the water into the conduits or pipes 20. In this manner the pumps 24 can continuously pump the water through the plenum chamber 26 and through the boilers or heat exchangers 28 into the sea. There is virtually no loss of head in the water because the weight of the water above sea level cancels out the force required to lift the warm surface sea water to that level, and the intake conduits or pipes 20 merely operate in the same manner as an ordinary syphon.

In a situation that necessitates the shutting down of one of the pumps 24 then the compressor 18 located over the inlet conduit 20 of that pump is also shut down. When the compressor 18 is shut down the air can be allowed to flow back through the compressor and raise the pressure above the sea water in the dome of the deaerator 16 to atmospheric pressure. This means that the level of water in said deaerator 16 will fall, as illustrated in FIG. 2, and as long as the other pump 24 continues to work the pressure in the plenum chamber 26 remains greater than the pressure of the sea water at the level surrounding the plenum chamber 26, thus the sea water level in the intake conduit or pipe 20 of the shut down pump will be slightly higher than sea level but lower than the upper intake end of the conduit or pipe 20. Thus the present concept makes it possible to use multiple parallel pumps in a sea thermal power plant without the need for check valves and without the pressure drop that would normally occur through such usage. The foregoing tends to aid and abet the economic success of a sea thermal power plant.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or the spirit of the invention as herein claimed.

I claim:

1. A thermal power plant having a hull, comprising means for preventing crustaceae from growing on heat exchange surfaces thereof, including:
   a plurality of pipes arranged in said hull in spaced parallel relation to one another and terminating in a common plenum chamber carried by said pipes beneath said hull;
   a plurality of boilers in said chamber communicating with the sea;
   pumps positioned in said pipes;
   the inlet end of said pipes being positioned above the level of the sea;
   a deaerator having a domed portion positioned over the inlet end of each of said pipes;
   a compressor connected to each of said domed portions for pulling a vacuum to lift the sea water into the domed portion to a level above the inlet end of each pipe;
   said pumps syphoning the sea water over the inlet ends and flowing said sea water through said pipes and chamber and boiler.

2. In a sea thermal power plant as defined in claim 1 wherein the pump in one of said pipes is inoperative and the compressor in the domed portion of the deaerator associated with said pipe is inoperative the level of water in said pipe will be above the level of the sea but below the inlet end of said pipe.

3. In a sea thermal power plant as defined in claim 1 wherein a screen matrix is positioned superjacent the inlet end of said pipes and the sea water that is drawn into the dearaetor by said compressor flows against said matrix whereby the normal sea wave motion cyclically moves the water up and down alternately wetting said screen matrix to present surface area to said compressors for pulling out excess air and foam in the water along with the expelling of the gases in said domed portion.

4. In a sea thermal power plant as defined in claim 1 wherein upper and lower inlet screens are connected to said power plant and warm surface sea water is drawn into the domed portions of the deaerators from beneath the upper screen.

* * * * *